(12) United States Patent
Nilsson et al.

(10) Patent No.: US 9,963,151 B2
(45) Date of Patent: May 8, 2018

(54) METHOD FOR CONTROLLING GEAR SHIFTING IN A HYBRID DRIVELINE BY USE OF AN ELECTRIC MACHINE

(71) Applicant: Scania CV AB, Södertälje (SE)

(72) Inventors: Mattias Nilsson, Södertälje (SE); Fredrik Sundén, Hägersten (SE); Mats Liwell, Södertälje (SE); Afram Kourie, Södertälje (SE)

(73) Assignee: SCANIA CV AB (SE)

( * ) Notice: Subject to any disclaimer, the term of this patent is extended or adjusted under 35 U.S.C. 154(b) by 72 days.

(21) Appl. No.: 15/032,206

(22) PCT Filed: Nov. 13, 2014

(86) PCT No.: PCT/SE2014/051348
§ 371 (c)(1),
(2) Date: Apr. 26, 2016

(87) PCT Pub. No.: WO2015/076723
PCT Pub. Date: May 28, 2015

(65) Prior Publication Data
US 2016/0264127 A1 Sep. 15, 2016

(30) Foreign Application Priority Data
Nov. 21, 2013 (SE) ...................... 1351381

(51) Int. Cl.
*B60W 30/19* (2012.01)
*B60K 6/48* (2007.10)
(Continued)

(52) U.S. Cl.
CPC ............. *B60W 30/19* (2013.01); *B60K 6/36* (2013.01); *B60K 6/387* (2013.01); *B60K 6/40* (2013.01);
(Continued)

(58) Field of Classification Search
CPC ...... B60W 30/19; B60W 20/30; B60W 20/40; B60W 10/02; B60W 10/08;
(Continued)

(56) References Cited

U.S. PATENT DOCUMENTS 6,533,701 B2 * 3/2003 Maruyama ............... B60K 6/48
477/3
2006/0293144 A1 * 12/2006 Nishina ..................... B60K 6/48
477/5
(Continued)

FOREIGN PATENT DOCUMENTS

EP 0 348 622 A2 1/1990
WO WO 86/03269 6/1986
(Continued)

OTHER PUBLICATIONS

Supplementary European Search Report dated Jun. 9, 2017 in corresponding European Patent Application No. EP 14 86 4309 (3 total pages).
(Continued)

*Primary Examiner* — Michael J Zanelli
(74) *Attorney, Agent, or Firm* — Ostrolenk Faber LLP

(57) ABSTRACT

A method to control a hybrid powertrain (2) in a vehicle, the powertrain including a combustion engine (3), an electric machine (4) and a gearbox (6) with an input shaft (10) and output shaft (18), wherein the combustion engine (3) and the electric machine (4) are connected to the input shaft (10). The method includes the steps of controlling the gearbox (6) to a neutral position; controlling the speed of the electric machine (4) to a predetermined speed, corresponding to a target speed for the input shaft (10) according to the next selected gear; engaging a gear in the gearbox (6); controlling the electric machine (4), so that the electric machine (4) accelerates or decelerates depending on a requested driving torque for the vehicle (1); detecting when a control signal for
(Continued)

the electric machine (4) corresponds to a predetermined signal value; and controlling the electric machine (4) to the requested driving torque. Also, a hybrid powertrain and a vehicle (1), and a computer program (P) and a computer program product for performing the method are disclosed.

8 Claims, 4 Drawing Sheets

(51) Int. Cl.
| | |
|---|---|
| B60W 10/08 | (2006.01) |
| B60W 10/11 | (2012.01) |
| B60W 30/18 | (2012.01) |
| F16H 3/12 | (2006.01) |
| F16H 3/091 | (2006.01) |
| F16H 61/04 | (2006.01) |
| B60K 6/36 | (2007.10) |
| B60K 6/40 | (2007.10) |
| B60K 6/547 | (2007.10) |
| B60W 10/06 | (2006.01) |
| B60W 20/10 | (2016.01) |
| B60W 20/30 | (2016.01) |
| B60W 20/40 | (2016.01) |
| B60K 6/387 | (2007.10) |
| F16H 63/50 | (2006.01) |
| B60W 10/02 | (2006.01) |
| B60W 20/00 | (2016.01) |

(52) U.S. Cl.
CPC .............. *B60K 6/48* (2013.01); *B60K 6/547* (2013.01); *B60W 10/06* (2013.01); *B60W 10/08* (2013.01); *B60W 10/11* (2013.01); *B60W 20/10* (2013.01); *B60W 20/30* (2013.01); *B60W 20/40* (2013.01); *F16H 3/091* (2013.01); *F16H 3/12* (2013.01); *F16H 3/126* (2013.01); *F16H 61/0403* (2013.01); *B60K 2006/4825* (2013.01); *B60W 10/02* (2013.01); *B60W 20/00* (2013.01); *B60W 30/18* (2013.01); *B60W 2300/12* (2013.01); *B60W 2510/083* (2013.01); *B60W 2510/104* (2013.01); *B60W 2510/1005* (2013.01); *B60W 2510/1015* (2013.01); *B60W 2540/10* (2013.01); *B60W 2710/021* (2013.01); *B60W 2710/0666* (2013.01); *B60W 2710/081* (2013.01); *B60W 2710/082* (2013.01); *B60W 2710/083* (2013.01); *B60W 2710/1005* (2013.01); *B60W 2710/1011* (2013.01); *B60W 2710/1038* (2013.01); *B60Y 2200/92* (2013.01); *B60Y 2300/188* (2013.01); *B60Y 2300/19* (2013.01); *F16H 61/0437* (2013.01); *F16H 2061/0422* (2013.01); *F16H 2063/506* (2013.01); *Y02T 10/6221* (2013.01); *Y02T 10/6252* (2013.01); *Y02T 10/6286* (2013.01); *Y10S 903/909* (2013.01); *Y10S 903/919* (2013.01); *Y10S 903/93* (2013.01); *Y10S 903/951* (2013.01)

(58) Field of Classification Search
CPC ........ F16H 61/0403; F16H 3/126; F16H 3/12; F16H 2061/0422; B60Y 2300/19
See application file for complete search history.

(56) References Cited

U.S. PATENT DOCUMENTS

| | | | |
|---|---|---|---|
| 2007/0259755 A1* | 11/2007 | Tanishima | B60K 6/387 477/3 |
| 2013/0109530 A1 | 5/2013 | Kaltenbach et al. | 477/5 |
| 2013/0296127 A1 | 11/2013 | Shelton et al. | |

FOREIGN PATENT DOCUMENTS

| | | |
|---|---|---|
| WO | WO 2007/085361 A1 | 8/2007 |
| WO | WO 2011/141233 A1 | 11/2011 |

OTHER PUBLICATIONS

International Search Report dated Mar. 5, 2015 in corresponding PCT International Application No. PCT/SE2014/051348.

* cited by examiner

METHOD FOR CONTROLLING GEAR SHIFTING IN A HYBRID DRIVELINE BY USE OF AN ELECTRIC MACHINE

CROSS-REFERENCE TO RELATED APPLICATIONS

The present application is a 35 U.S.C. § § 371 national phase conversion of PCT/SE2014/051348, filed Nov. 13, 2014, which claims priority of Swedish Patent Application No. 1351381-7, filed Nov. 21, 2013, the contents of which are incorporated by reference herein. The PCT International Application was published in the English language.

BACKGROUND OF THE INVENTION AND PRIOR ART

The present invention relates to a method to control a hybrid powertrain in a vehicle, to a hybrid powertrain, which comprises elements to control the method, and also a vehicle, which comprises such a hybrid powertrain.

Some trucks are equipped with a transmission of both an automatic and a manual type. With this type of transmission, shifting is carried out from a first gear to a second gear by bringing the gearbox from one torque state in the powertrain to a substantially zero torque state, subsequently disengaging the current gear, and subsequently synchronizing the input shaft's speed and the lay shaft's speed to a speed corresponding to the second gear. Subsequently, the second gear is engaged, followed by bringing the gearbox to a powertrain torque state requested by the driver.

The vehicle may be powered by a combustion engine and an electric machine, which interact to produce the desired output and to, among other things, achieve good fuel economy in the vehicle. The electric machine may, at acceleration and constant speed of the vehicle, function as an electric engine. At deceleration of the vehicle, the electric machine may function as a generator and exert a braking torque on the vehicle's powertrain.

In the powertrain, there are gaps between the components interacting in the transmission, arising e.g. as a result of backlash among cogwheels in engagement. There is also a torsion spring effect in the rotatable shafts in the powertrain. The gaps and the torsion spring effect become most evident when the gearbox is brought to a powertrain torque state from a substantially zero torque state. In the event the electric machine is accelerated or decelerated after a second gear has been engaged, the gaps and resilient shafts will cause a pulse and a shock wave in the hybrid powertrain, which will be experienced as a disturbance by the driver and passengers in the vehicle. The pulse and the shock wave may also elicit a swinging in the hybrid powertrain because of the torsion spring effect of the shafts. This swinging will also be perceived as uncomfortable by the vehicle's driver and passengers.

After the second gear has been engaged and torque is supplied to the transmission, there is no guarantee that the combustion engine will be operated at the speed required for it to be connected and supply torque to the transmission. Therefore, time is needed to control the combustion engine to the desired speed and torque.

WO 2011141233, A1 shows a vehicle equipped with a hybrid powertrain, which comprises a combustion engine and an electric machine. At shifting, the electric machine's moment of inertia is used for synchronization. Thus, synchronization rings in the gearbox may be eliminated.

SUMMARY OF THE INVENTION

Despite prior art solutions, there is a need to further develop a hybrid powertrain, which provides good driving comfort in the vehicle during shifting, which has a short shifting time and which compensates for a poorly estimated contact point between the coupling parts of the coupling device at the connection of the combustion engine.

The objective of the present invention is thus to provide a hybrid powertrain, which provides good driving comfort in the vehicle during shifting.

Another objective of the invention is to provide a hybrid powertrain with a short shifting time.

Another objective of the invention is to provide a hybrid powertrain, which compensates for a poorly estimated contact point between the coupling parts of the coupling device at connection of the combustion engine to the hybrid powertrain.

A hybrid powertrain disclosed herein will provide good driving comfort during shifting for the driver and passengers in the vehicle. By controlling the electric machine's acceleration or deceleration, and detecting a control signal for when the electric machine reaches or exceeds a predetermined torque level, a pulse and a shock wave in the hybrid powertrain may be avoided, and increasing the driving comfort in the vehicle.

According to one embodiment, the electric machine's acceleration and torque are controlled. This means that any gaps and torsion spring effects in the powertrain are taken care of and evened out, avoiding the pulse and shock wave in the hybrid powertrain, so that driving comfort in the vehicle increases.

According to another embodiment, the combustion engine is connected when a predetermined torque has been reached in the electric machine or when a maximum torque for the electric machine has been reached, if that maximum torque is lower than the predetermined torque. Since the coupling device is closed and the combustion engine is connected only when the gap and torsion spring in the powertrain have been wound up, compensation for a poorly estimated contact point between the coupling parts of the coupling device is obtained. This provides a robustness and soft connection of the combustion engine.

According to another embodiment, the combustion engine is disconnected from the input shaft with the coupling device, before shifting occurs. The hybrid powertrain will thus have a short shifting time.

The above objectives are also achieved with a hybrid powertrain of the type disclosed herein, and by a vehicle of the type specified herein.

Other advantages of the invention are set out in the detailed description below.

BRIEF DESCRIPTION OF THE DRAWINGS

Below is a description, as an example, of preferred embodiments of the invention with reference to the enclosed drawings, in which.

DETAILED DESCRIPTION OF PREFERRED EMBODIMENTS OF THE INVENTION

Figure 1:
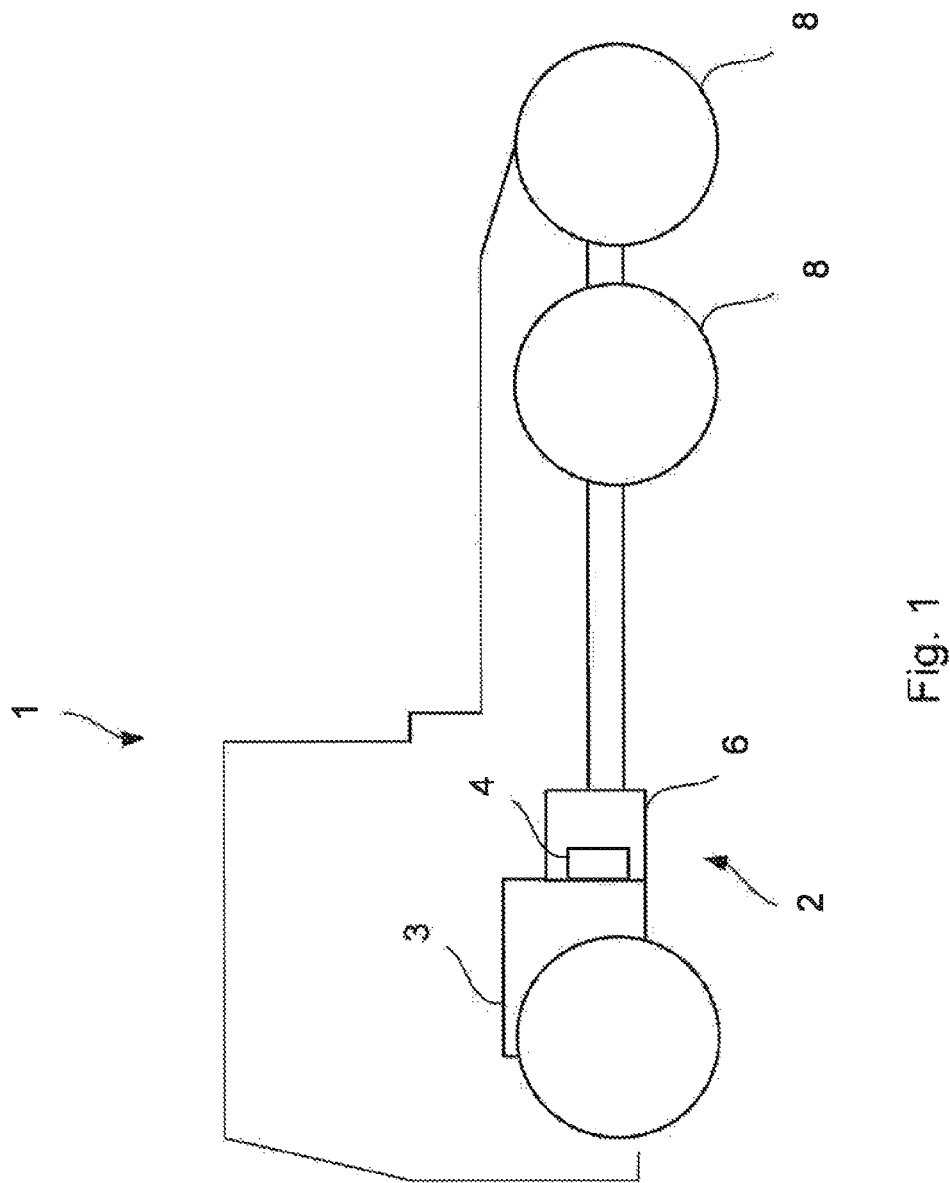
FIG. 1 shows a schematic side view of a vehicle with a powertrain according to the present invention.

FIG. 1 shows a schematic side view of a vehicle 1, comprising a hybrid powertrain 2 with a combustion engine 3 and an electric machine 4, which are connected to a gearbox 6. The gearbox 6 is also connected to the driving wheels 8 of the vehicle 1.

Figure 2:
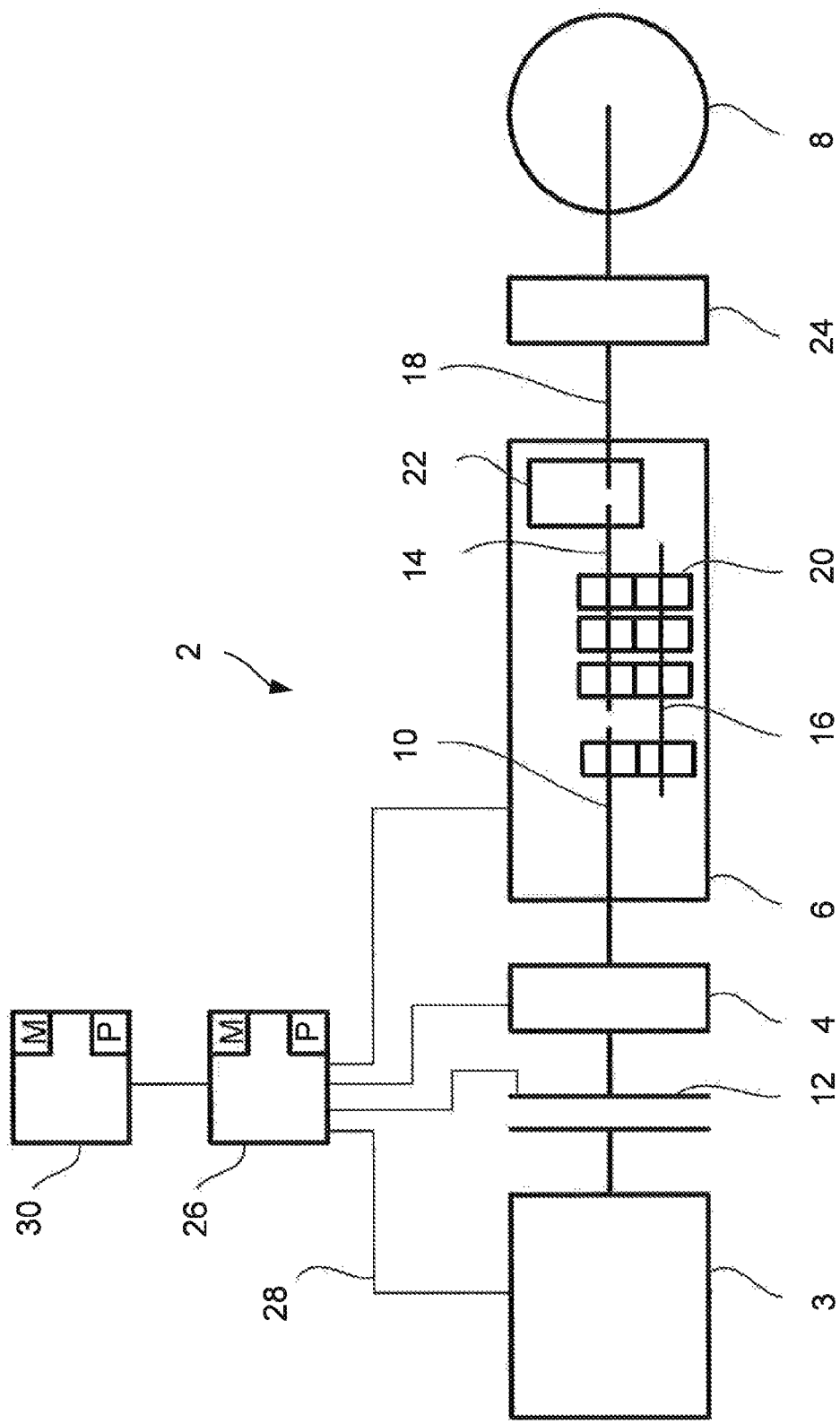
FIG. 2 shows a schematic side view of a powertrain according to the present invention.

FIG. 2 shows a schematic view of a hybrid powertrain 2, comprising a combustion engine 3 and an electric machine 4, which are connected to an input shaft 10 of the gearbox 6. The combustion engine 3 may be connected to and disconnected from the input shaft 10 via a coupling device 12, which may be manually and/or automatically maneuverable. The gearbox 6 is preferably a combined manual and automatic gearbox 6 of split type and comprises a main shaft 14, a lay shaft 16, and an output shaft 18 on which one or several cogwheels 20 are arranged. Between the main shaft 14 and the output shaft 18, a retarder 22 is arranged. The output shaft 18 is connected to a final gear 24, which in turn is connected to the driving wheels 8 of the vehicle 1. An electronic control device 26 is connected to the combustion engine 3, the coupling device 12, the electric machine 4 and the gearbox 6 via electrical conductors 28. Instead of transmitting signals through the electrical conductors 28, signals between the electronic control device 26 and the combustion engine 3, the coupling device 12, the electric machine 4 and the gearbox 6 may be transmitted by wirelessly. The electronic control device 26 may comprise a memory M and a computer program P. It is also possible to connect a computer 30 to the control device 26.

Figure 3:
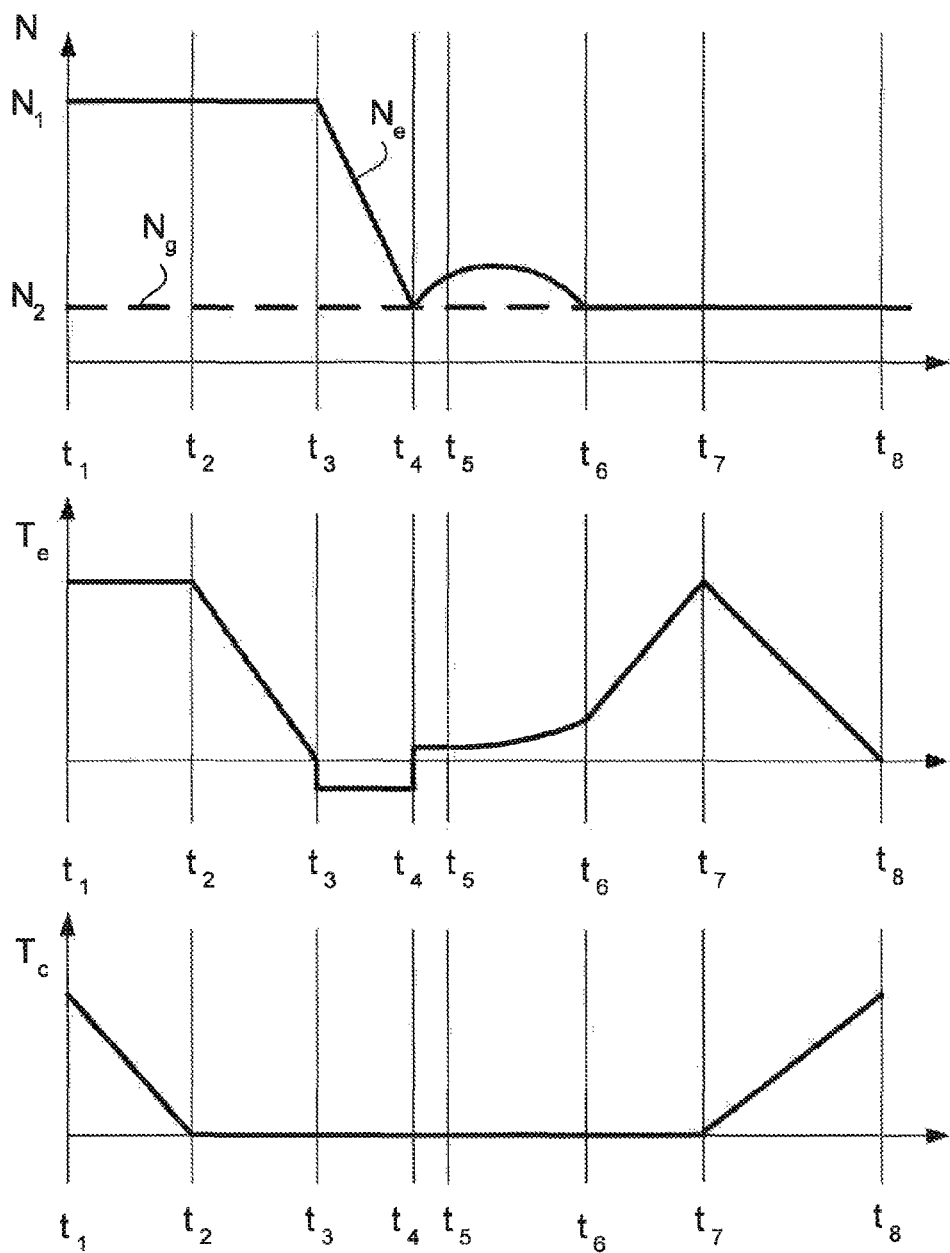
FIG. 3 shows a diagram of speed and torque in the method to control the hybrid powertrain according to the present invention.

FIG. 3 shows a diagram of speed and torque in the method to control the hybrid powertrain 2 according to the present invention. The top solid curve represents the speed Ne of the electric machine 4 at a first gear. The dashed curve represents the speed Ng of the electric machine 4 at a second gear. Thus, the diagram in FIG. 3 represents an upshift. FIG. 3 also shows the torque Te of the electric machine 4 and the torque Tc of the combustion engine 3. At the point in time t1, the vehicle 1 is operated by the electric machine 4 with the speed N1 and by the combustion engine 3 at the first gear. In order to complete a shifting process from the first to the second gear, the combustion engine 3 is disconnected from the input shaft 10 of the gearbox 6 with the coupling device 12, at the point in time t2. Before this, between the points in time t1 and t2, the torque of the combustion engine 3 has been ramped down to zero, which occurs at t2, following which a substantially zero torque state between the lay shaft 16 and the main shaft 14 is created with the help of the electric machine 4, which occurs at the point in time t3. When a substantially zero torque state has been created, the first gear is disengaged at t3, so that the gearbox 6 assumes a neutral position. Subsequently, a synchronization phase is initiated where the speed of the electric machine 4 between the points in time t3 and t4 is reduced towards N2. When the speed of the electric machine has reached the speed N2, which occurs at the point in time t4, the second gear's cogwheel on the main shaft will assume the same speed as the main shaft, whereupon the second gear's cogwheel is connected with the main shaft. The second gear is thus engaged at the point in time t4.

Disengagement of the first gear, synchronization and engagement of the second gear occurs in the gearbox 6 and is controlled by the electronic control device 26. A number of speed sensors and elements to detect the torque (not displayed) are arranged in the hybrid powertrain 2 to provide information about the speed and torque of the combustion engine 3, the coupling device 12, the electric machine 4 and the rotating components in the gearbox 6.

When the second gear is engaged, the electric machine 4 is connected with the driving wheels 8 of the vehicle 1 via the gearbox 6 and the final gear 24. In the gearbox 6 and the final gear 24, there are gaps between the components interacting in the gearbox 6 and the final gear 24, e.g. backlash between cogwheels 20 in engagement. There is also a torsion spring effect in the rotatable shafts in the gearbox 6 and the final gear 24, and in the shafts that connect the gearbox 6, the final gear 24 and the driving wheels 8, such as propeller and driving shafts. In the event the electric machine 4 is accelerated or decelerated sharply after the second gear has been engaged, said gap and resilient shafts will cause a pulse and a shock wave in the hybrid powertrain 2, which will be experienced as a disturbance by the driver and passengers in the vehicle 1. The pulse and the shock wave will also elicit a swinging in the hybrid powertrain 2, due to the torsion spring effect of the shafts. This swinging will also be perceived as uncomfortable by the driver and passengers of the vehicle 1.

By controlling the electric machine's 4 torque with a control signal according to the method of the invention, a limited torque is obtained, so that a pulse and a shock wave in the hybrid powertrain 2 are avoided, which means that the negative effects described above are eliminated. Thus the electric machine 4 is accelerated with a limited torque with the control device 26, after the second gear has been engaged at t4. For a time period between t4 and t5, the electric machine's 4 speed and torque will increase without any significant torque being transmitted to the driving wheels 8 of the vehicle 1, because of the gap and torsion spring in the powertrain 2.

The control signal that controls the torque to the electric machine 4 may be described as:

$$\tau_{e\_req} = J_e \times \dot{\omega}_W + \tau_e - J_e \times \dot{\omega}_e \pm \text{Offset} \quad [1]$$

$\tau_{e\_req}$ relates to the requested torque for the electric machine 4

$J_e$ represents the moment of inertia of the electric machine 4.

$\dot{\omega}_W$ represents acceleration of the driving wheels 8 of the vehicle 1.

$\tau_e$ represents torque from the electric machine 4.

$\dot{\omega}_e$ represents the acceleration of the electric machine 4.

Offset represents a predetermined value for the acceleration of the electric machine. The lower the offset value, the longer the time to absorb the gap in the powertrain.

At t5, a state is achieved where the gap has been absorbed by the speed of the electric machine 4. Subsequently the electric machine 4 decelerates, so that the part of the control signal which represents $-J_e \times \dot{\omega}_e$ will provide a positive addition to the control signal. When the control signal exceeds a certain predetermined value, which in FIG. 3 occurs at the point in time t6, the gap in the powertrain is deemed to be eliminated.

The larger the gap and torsion spring effect in the hybrid powertrain 2, the longer the time period between t4 and t6. The time period between t4 and t6 is impacted by the Offset value, which may be predetermined or determined instantly via a feedback function to the control device 26. In the event the Offset value is predetermined, the predetermination is determined by empirical values for the size of the gap and the torsion spring effect, and the time it takes to even out the gap and the torsion spring effect.

When the control signal to the electric machine 4 reaches a predetermined signal value, corresponding to the predetermined torque for the eliminated gap in the powertrain, the torque is increased to a requested torque, which is, preferably, selected by a driver in the vehicle 1. Thus, the vehicle 1 will be impacted by a desired torque. In the event the electric machine 4 reaches its limitation with respect to speed and/or torque, or reaches a certain torque level that may be calibrated, the combustion engine 3 is connected to the input shaft 10 by activating and closing the coupling device 12, which occurs at t7. Since the coupling device 12 is closed when the gap and torsion spring in the powertrain 2 have been wound up, compensation for a poorly estimated contact point between the coupling parts of the coupling device 12 is obtained. This provides a robustness and a soft connection of the combustion engine 3. When the combustion engine 3 has been connected, a torque delivered by the electric machine 4 may be controlled to a predetermined target torque based, on a suitable operating strategy, while a decreasing torque from the electric machine 4 may be compensated with torque from the combustion engine 3 and adapted to the torque requested by the driver, which occurs at t8.

FIG. 3 represents an upshift from a first gear to a second gear. The invention is also applicable at a downshift from a second to a first gear.

Figure 4:
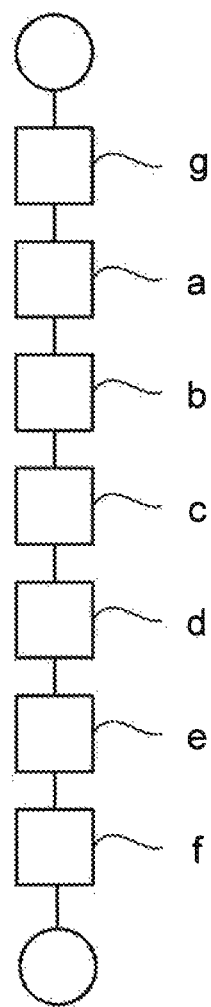
FIG. 4 shows a flow chart of the method to control the hybrid powertrain according to the present invention.

FIG. 4 shows a flow chart of the method to control the hybrid powertrain 2 according to the present invention. The method comprises the following steps:

a) to control the gearbox 6 to a neutral position;
b) to control the speed of the electric machine 4 to a predetermined speed, which corresponds to a target speed for the input shaft 10 according to the next gear selected;
c) to engage a gear in the gearbox 6;
d) to control the electric machine 4, so that the electric machine 4 is accelerated or decelerated depending on a requested driving torque for the vehicle 1;
e) to detect when a control signal for the electric machine 4 corresponds to a predetermined signal value; and
f) to control the electric machine 4 to the requested driving torque.

The target speed of the input shaft 10 is controlled by the selected gear in the gearbox 6, and may be calculated with the gear ratio between the input shaft 10 and the output shaft 18 for the selected gear. Thus, the speed of the input shaft 10 may be calculated as a target speed before the new gear is engaged.

During the step d) above, the electric machine 4 is accelerated or decelerated depending on whether the requested driving torque for the vehicle 1 is positive or negative, i.e. whether the requested driving torque for the vehicle 1 has a positive or negative sign.

In step d) the electric machine 4 may, according to one embodiment, be controlled with a predetermined torque limitation. During a time period in step d), the electric machine 4 will accelerate or decelerate without any significant torque being transmitted to the driving wheels 8 of the vehicle 1, because of the gap and torsion spring in the powertrain 2. By controlling the electric motor with a predetermined torque limitation, a pulse and a shock wave in the powertrain are avoided.

By detecting, in step e), when a control signal for the electric machine 4 corresponds to a predetermined signal value with respect to the torque of the electric machine 4, any potential gap and torsion spring occurring in the powertrain may be taken into account. When the control signal exceeds a certain predetermined value, the gap and torsion spring in the powertrain are deemed to be eliminated, so that a pulse and a shock wave in the powertrain are avoided.

Before step a), according to one embodiment, in step g), the combustion engine 3 may be disconnected from the input shaft 10 via a coupling device 12. The combustion engine 3 is then disconnected from the powertrain.

After the step f), in step h), the combustion engine 3 may, according to one embodiment, be connected and controlled to the requested driving torque, when the electric machine 4 has achieved the requested driving torque or when a maximum torque for the electric machine 4 has been achieved, if the maximum torque for the electric machine 4 is lower than the requested driving torque.

According to one embodiment, the hybrid powertrain 2 is controlled with an electronic control device 26.

According to the invention, a computer program P is provided, which may comprise procedures to control the hybrid powertrain 2 according to the present invention.

The computer program P may comprise procedures to control the gearbox 6 to a neutral state. The computer program P may comprise procedures to control the speed of the electric machine 4 to a predetermined speed, which corresponds to a target speed for the input shaft 10 according to the next gear selected. The computer program P may comprise procedures to engage a gear in the gearbox 6. The computer program P may comprise procedures to control the electric machine 4, so that the electric machine 4 is accelerated or decelerated depending on a requested driving torque for the vehicle 1. The computer program P may comprise procedures to detect when a control signal for the electric machine 4 corresponds to a predetermined signal value. The computer program P may comprise procedures to control the electric machine 4 to the requested driving torque.

The computer program P may comprise procedures to control the electric machine 4 with a predetermined torque limitation. The computer program P may comprise procedures to, before the step, disconnect the combustion engine 3 from the input shaft 10 with a coupling device 12. The computer program P may comprise procedures to connect and control the combustion engine 3 to the requested driving torque, when the electric machine 4 has achieved the requested driving torque or when a maximum torque for the electric machine 4 has been achieved, if the maximum torque for the electric machine 4 is lower than the requested driving torque. The program P may be stored in an executable manner, or in a compressed manner, in a memory M and/or a read/write memory R.

The invention also relates to a computer program product comprising program code stored in a medium readable by a computer 30, to perform the method steps specified above, when said program code is executed in the electronic control device 26 or another computer 30 connected to the control device 26.

The components and features specified above may, within the framework of the invention, be combined between different embodiments specified.

The invention claimed is:

1. A method to control a hybrid powertrain in a vehicle, wherein the powertrain comprises a combustion engine, an electric machine, and a gearbox with an input shaft and an output shaft, wherein the combustion engine and the electric machine are connected to the input shaft, the method comprising:
- a) controlling the gearbox to a neutral position;
- b) controlling the speed of the electric machine to a predetermined speed that corresponds to a target speed for the input shaft according to a next gear selected;
- c) engaging the next selected gear in the gearbox; thereafter,
- d) controlling the electric machine, to accelerate or decelerate depending on a requested driving torque for the vehicle;
- e) detecting, in response to the acceleration on deceleration, when a control signal for the electric machine corresponds to a predetermined signal value; and
- f) when the control signal corresponds to the predetermined signal value, controlling the electric machine to the requested driving torque.

2. A method according to claim 1, wherein step d) comprises controlling the electric machine with a predetermined torque limitation.

3. A method according to claim 1, further comprising before performing step a):
- g) disconnecting the combustion engine from the input shaft via a coupling device.

4. A method according to claim 1, further comprising, before performing step f):
- h) connecting and controlling the combustion engine to the requested driving torque, when the electric machine has achieved the requested driving torque or when a maximum torque for the electric machine has been achieved, wherein the connecting and controlling of the combustion engine is performed only if the maximum torque for the electric machine is lower than the requested driving torque.

5. A method according to claim 1, further comprising controlling the hybrid powertrain via an electronic control device.

6. A hybrid powertrain, comprising elements configured and cooperating to perform and control the method according to claim 1.

7. A vehicle, comprising a hybrid powertrain according to claim 6.

8. A non-transitory computer-readable medium product comprising a computer program for controlling a hybrid powertrain, the computer program configured, when executed by a computer, to cause an electronic control device or another computer connected to the electronic control device to cause performance of the method steps according to claim 1.

* * * * *